(No Model.)
R. E. LUTTERS.
SCARF PIN LOCKING DEVICE.
No. 547,757. Patented Oct. 8, 1895.
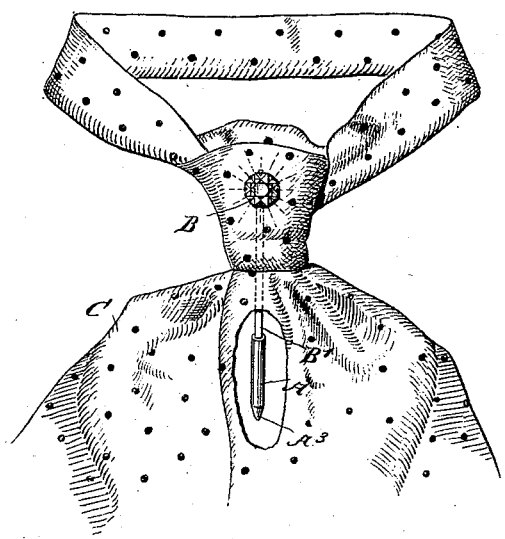
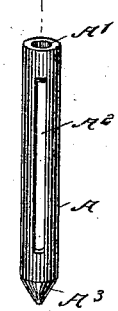
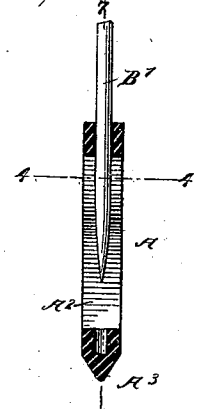
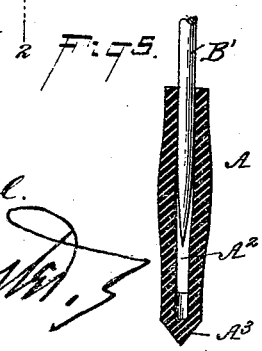
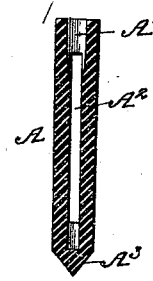
WITNESSES:
William Goebel.
INVENTOR
R. E. Lutters
BY
Munn & Co.
ATTORNEYS.
ANDREW B.GRAHAM. PHOTO-LITHO. WASHINGTON.D.C.

UNITED STATES PATENT OFFICE.

ROBERT E. LUTTERS, OF COLLEGE POINT, NEW YORK.

SCARF-PIN LOCKING DEVICE.

SPECIFICATION forming part of Letters Patent No. 547,757, dated October 8, 1895.

Application filed March 29, 1895. Serial No. 543,741. (No model.)

*To all whom it may concern:*

Be it known that I, ROBERT E. LUTTERS, of College Point, in the county of Queens and State of New York, have invented a new and Improved Scarf-Pin Locking Device, of which the following is a full, clear, and exact description.

The object of the invention is to provide a new and improved scarf-pin locking device which is simple and durable in construction, readily applied or removed, and arranged to securely lock the pin in place to prevent it from being lost or stolen.

The invention consists of a sleeve having flexible walls adapted to engage and clamp the shank of the pin.

The invention also consists of certain parts and details and combinations of the same, as will be fully described hereinafter, and then pointed out in the claim.

Reference is to be had to the accompanying drawings, forming a part of this specification, in which similar letters of reference indicate corresponding parts in all the views.

Figure 1 is a perspective view of the improvement as applied on a scarf, part of the latter being broken out. Fig. 2 is an enlarged sectional side elevation of the improvement on the line 2 2 of Fig. 3. Fig. 3 is an enlarged perspective view of the same. Fig. 4 is a sectional plan view of the same on the line 4 4 of Fig. 2. Fig. 5 is a longitudinal section on about line 7 7 of Fig. 2; and Fig. 6 is a similar section, the pin being removed.

The improved locking device for scarf-pins and other similar devices is provided with a sleeve A, formed with a central bore or inlet-opening A', adapted to loosely engage the shank B' of the pin B. The walls of the sleeve A are made flexible, so as to engage and clamp the shank B' after the pin B is inserted and has penetrated the rear of the scarf C, as plainly illustrated in Fig. 1. Thus, when the sleeve A is inserted on the pointed end of the shank B', it is securely clamped thereon, and consequently the upper end of the sleeve abuts against the back of the scarf to prevent the pin B from becoming accidentally displaced in the scarf or pulled out by force by unauthorized persons.

In order to securely clamp the sleeve A on the shank B', I form the sleeve with a transverse slot $A^2$, extending from near the upper end of the sleeve to within a short distance of the lower pointed end $A^3$, as plainly indicated in Figs. 2, 3, and 4. This slot $A^2$ divides the sleeve into opposite elastic or resilient walls, the space between which communicates at its upper end with the inlet-opening A', and the space between said resilient walls is somewhat narrower than the diameter of the shank B', so that when the latter passes into the bore A' or the sleeve is slipped upon the shank the side walls of the sleeve on the sides of the slot $A^2$ bulge outward, as indicated in Fig. 2, and firmly clamp with their inner surfaces the exterior surface of the shank B'. At the lower end of the space between the resilient walls and communicating with such space I provide a point-receiving socket D, into which the point of the pin may project, such socket tending to avoid any twisting or forcing of the lock out of alignment with the pin and also protecting the point of the pin, as will be readily understood.

The safety locking device is preferably made of hard rubber, but other suitable material may be employed. It will be seen that the locking device also forms a protection for the pointed end of the shank B'.

Having thus fully described my invention, I claim as new and desire to secure by Letters Patent—

As a new article of manufacture, a locking device for scarf pins composed of the sleeve having at one end an inlet opening adapted to freely receive the pin shank and having a continuous unsplit portion surrounding such inlet opening, the sleeve having below such inlet opening a longitudinally extended slot forming opposite separated walls extending lengthwise in the direction of the length of the sleeve and normally spaced apart a distance less than the diameter of the inlet opening and of the pin shank and adapted to be spread apart by the insertion of the pin longitudinally between them, substantially as and for the purpose set forth.

ROBERT E. LUTTERS.

Witnesses:
JOHN HEINZE,
ADAM P. STRAUBE.